United States Patent
Osborn et al.

(10) Patent No.: US 6,249,791 B1
(45) Date of Patent: Jun. 19, 2001

(54) SUMMARY TABLE MANAGEMENT IN A COMPUTER SYSTEM

(75) Inventors: Andrew P. Osborn, Bath; Robert L. Lavender, Somerset; Stephen D. Cave, Gloucester, all of (GB)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/314,457

(22) Filed: May 18, 1999

Related U.S. Application Data (63) Continuation of application No. 08/962,029, filed on Oct. 31, 1997, now Pat. No. 6,023,695.

(51) Int. Cl.[7] .................................................. G06F 17/30
(52) U.S. Cl. ............................................................ 707/200
(58) Field of Search .................................. 707/200, 3, 2, 707/4, 5, 102, 101, 104, 503, 509, 1, 7, 201, 204, 103

(56) References Cited

U.S. PATENT DOCUMENTS

| | | | |
|---|---|---|---|
| 5,404,510 | 4/1995 | Smith et al. | 707/2 |
| 5,519,859 | 5/1996 | Grace | 707/3 |
| 5,664,173 | 9/1997 | Fast | 707/4 |
| 5,675,785 | 10/1997 | Hall et al. | 707/102 |
| 5,864,846 | 1/1999 | Voorhees et al. | 707/5 |

OTHER PUBLICATIONS

Designer's Guide Manual For Business Objects For Windows 4.0 (section entitled "Aggregate Navigation"), pp. 133–135, Sep. 1996.

Primary Examiner—Hosain T. Alam
Assistant Examiner—Sanjiv Shah
(74) Attorney, Agent, or Firm—Lyon & Lyon LLP (57) ABSTRACT

A self monitoring system that identifies optimum summary table(s) for use by a database management system, and that automatically creates or deletes summary tables based on selected summary table recommendations.

20 Claims, 8 Drawing Sheets

| EMP NAME | SOC SEC NO | DEPT NO | SALARY |
|---|---|---|---|
| A. WALTERS | 000513469 | 52 | 32500 |
| B. SCOTT | 017325400 | 48 | 47000 |
| J. FRANK | 018142139 | 52 | 96000 |
| T. WILSON | 012598134 | 50 | 12000 |
| E. HARMON | 013026998 | 03 | 40000 |
| G. NICOL | 005714652 | 09 | 350000 |

*FIG. 2A*

| DEPT NAMES | DEPT NO |
|---|---|
| QUALITY ASSURANCE | 09 |
| MANUFACTURING | 48 |
| PERSONNEL | 50 |
| ENGINEERING | 52 |

| SQL QUERY | DATE | TIME | USER ID | TBLS/DATA ITEMS ACCESSED | SUMMARY TBL ACCESSED? | EST SYS COST | CPU TIME | ACTUAL RESP TIME |
|---|---|---|---|---|---|---|---|---|
| EMP NAMES OF EMP DEPT 20 | 031197 | 1301 | 50 | LOCATION_A | Y | 200 | 12.4 | 20.2 |
| EMP SALS OF EMP DEPT 50 | 031197 | 1304 | 50 | LOCATION_C | Y | 300 | 8.2 | 34.7 |
| DEPT NAMES OF DEPT NOS>20 | 031197 | 1310 | 50 | LOCATION_B | Y | 150 | 9.7 | 48.5 |
| AVG SAL FOR EACH DEPT | 031197 | 1400 | 50 | LOCATION_G | N | 1000 | 50.1 | 200.6 |

SUMMARY TABLE MANAGEMENT IN A COMPUTER SYSTEM

This is a continuation of application Ser. No. 08/962,029 filed Oct. 31, 1997 U.S. Pat. No. 6,023,695.

FIELD OF THE INVENTION

The present invention pertains to the field of computer systems including, more particularly, to methods and apparatus of summary table management in computer systems.

BACKGROUND OF THE RELATED ART

In database management systems (DBMS), including relational database systems, the retrievable data is typically stored in the form of tables. Typically each column of a given table-represents a particular data attribute while each row represents a specific record. The row/column combination, e.g., each field of a row, represents a particular data item. A user of a database accesses data from one or more tables by submitting a query to the respective DBMS. The DBMS typically responds to the query by constructing a particular view of the data stored in the tables and returning a responsive data set to the user.

In known large database systems, users often issue queries which require aggregation of data from large tables and/or which require aggregation of data from two or more tables. Responding to such queries can be time consuming. As a result, it is not uncommon for a database to include one or more summary tables, which contain selected subsets of data items, and/or aggregations of data items from one or more tables. A particular advantage of summary tables is that they contain pre-generated values, which allow the DBMS to more quickly access and retrieve queried data, a task that could otherwise be costly and time consuming.

One of the issues with database management systems which utilize summary tables is knowing which summary tables to create to most benefit system performance. Summary tables may be large and there may be many of them associated with a single database. As such, summary tables can take up considerable space in the database and large amounts of server CPU time may be required to generate and populate the summary tables on a regular basis. Thus, the convenience of using summary tables is usually balanced against the resource time expended in creating and refreshing the summary tables, as well as the additional storage space required to maintain them.

Consequently, database system administrators, those individuals tasked with administering a database management system, need to know precisely what summary table they should create and with what combinations of information. Ideally a system administrator would like to create only those summary tables that would make the best use of the system resources. Known current systems traditionally depend on someone to analyze user requirements and, based upon this analysis, decide upon a set of summary tables to satisfy the users' requirements. Thus, the system administrators spend considerable time analyzing user queries to determine which summary tables will provide the most benefit. Alternatively, system administrators may use ad hoc methods to guess which set of summary tables will best serve the system. While the latter approach results in less time to create the summary tables, it can result in summary tables being built and maintained that are not particularly useful or optimum. In any event, once those queries for which a summary table is to be built are identified, the DBA must then execute the requisite system instructions to build the summary tables. Finally, the use of tables in a database may vary over time, either because of new data or because of different query patterns. It is difficult for a system administrator to know when these changes have occurred, rendering a particular summary table unnecessary.

Thus, it would be advantageous to provide a system that will automatically tune itself according to system demands to achieve faster searching and retrieval of data while keeping system resource usage at a minimum. It would be advantageous to have an improved methodology for identifying data sets for which summary tables should be created and maintained for a given database and for determining when a summary table is no longer beneficial due to changed data or query patterns. It would be further advantageous to provide a mechanism to automatically create and remove summary tables from the database.

The present inventions solve these problems and more.

SUMMARY OF THE INVENTION

The present invention includes a self monitoring system that automatically tunes itself according to system demands, such as for example, system loads and patterns of use, resulting in more efficient execution of user queries while minimizing machine resources required to accomplish this. The self monitoring system includes the collection of statistics about system usage to assist in the selection of summary tables to create and the capability to create, populate and refresh summary tables.

In a preferred embodiment, query statistics are generated from submitted queries and stored in a local stat table. The query statistics from local stat tables are used to create a system stat table. Based on a combination of the frequency of a submitted query, and the length of time required for the computer system to execute the query, recommendations for creating or deleting summary tables are formed.

Upon selection of one or more recommendations for summary table creations, the system can automatically create the table. In the preferred embodiment the self-monitoring system automatically generates an appropriate SQL query, allocates memory for the summary table to be created, executes the generated SQL query, and populates the summary table with the appropriate data set. Upon selection of a recommendation to delete a summary table, the system automatically deletes the selected summary table from the database.

In accordance with one aspect of a preferred embodiment of the present invention, a database applications layer of a user station of a computer system may be configured to automatically monitor a database and automatically create or delete summary tables from a database. By example, in a preferred embodiment, a database applications layer includes a program to generate summary table creation and/or deletion recommendations at specified time intervals, and, thereafter, submit one or more queries to a DBMS to create a predetermined number of summary tables corresponding to the highest ranked summary table creation recommendations and/or delete a predetermined number of summary tables corresponding to the highest ranked summary table deletion recommendations.

An object of an aspect of the present inventions is to provide a methodology for generating statistical data on user-submitted queries, and thereafter use the generated query statistics to form a ranking of recommended summary tables to be created and/or deleted. Another object of an aspect of the present inventions is to provide a methodology for automatically creating or deleting summary tables based on selected summary table recommendations.

Other and further objects, features, aspects, and advantages of aspects of the present inventions are found in the following detailed description of the preferred embodiments illustrated in the accompanying drawings.

BRIEF DESCRIPTION OF THE ACCOMPANYING DRAWINGS

The drawings illustrate preferred embodiments of the present invention, in which.

DETAILED DESCRIPTION OF THE PREFERRED EMBODIMENTS

In the following description, for purposes of explanation, numerous specific details are set forth in order to provide a thorough understanding of the present invention. It will be apparent, however, to one skilled in the art, that the present invention may be practiced without these specific details. In other instances, well-known structures and devices are shown in block diagram form in order to avoid unnecessarily obscuring the present invention.

A computer system generally may take many forms, from a configuration including a variety of processing units, as further described herein, networked together to function as a integral entity, to a single computer, e.g., a personal computer, operational in a stand-alone environment. The present invention can be embodied in any of these computer system configurations.

Figure 1A:
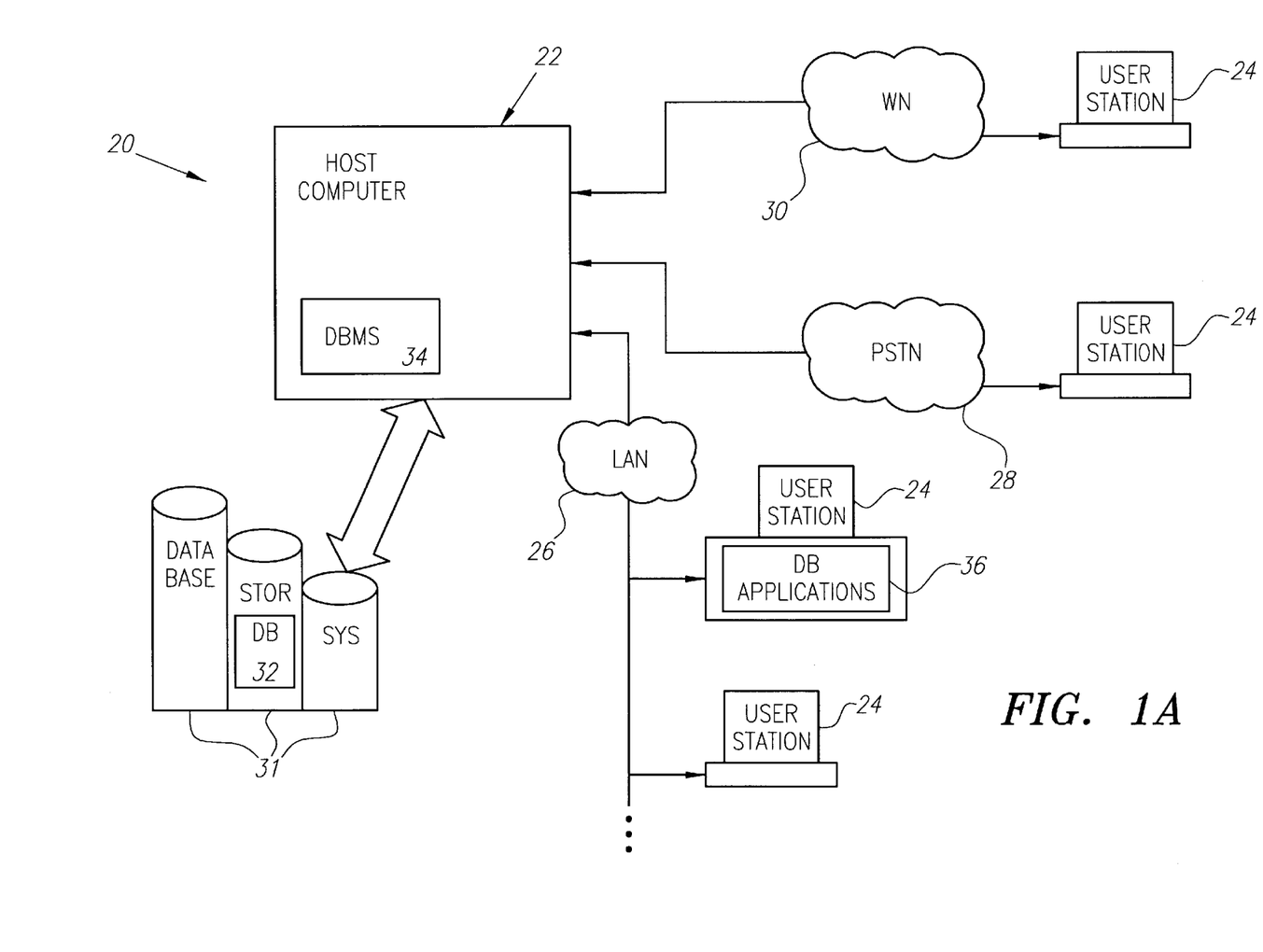
FIG. 1A is a simplified block diagram of an exemplary computer system operating in conjunction with a database.

Referring to FIG. 1A, in a presently preferred embodiment, a computer system 20 includes a host computer 22 connected to a Plurality of individual user stations 24. In a presently preferred embodiment, the user stations 24 each comprise suitable data terminals, such as, e.g., personal computers, portable laptop computers, or personal data assistants ("PDAs"), which can store and independently run one or more applications (i.e., programs). For purposes of illustration, some of the user stations 24 are connected to the host computer 22 via a local area network ("LAN") 26. Other user stations 24 are remotely connected to the host computer 22 via a public telephone switched network ("PSTN") and/or a wireless network 30.

In a presently preferred embodiment, the host computer 22 operates in conjunction with a data storage system 31, wherein the storage system 31 contains a database 32 that is readily accessible by the host computer 22. In a presently preferred embodiment, the database 32 is a relational database.

In alternative embodiments, the database 32 may be resident on the host computer, stored, e.g., in the host computer's ROM, PROM, EPROM, or any other memory chip, and/or its hard disk. In yet alternative embodiments, the database 32 may be read by the host computer 22 from one or more floppy disks, flexible disks, magnetic tapes, any other magnetic medium, CD-ROMs, any other optical medium, punchcards, papertape, or any other physical medium with patterns of holes, or any other medium from which a computer can read.

The host computer 22 includes a database management system ("DBMS") 34, which is one or more programs and/or hardware circuitry, configured to access data stored in the database 32. In a presently preferred embodiment, each of the user stations 24 includes its own database applications layer 36, which is one or more programs and/or hardware circuitry configured to interact with the DBMS 34.

The respective database applications layer 36 of a user station 24 allows a user of the computer system 20 to access data from the database 32 by forming and submitting queries on the user station 24. In particular, in a presently preferred embodiment, a user-submitted query is converted into an SQL statement by the database applications layer 36 resident in the respective user station 24. SQL is a standard language used in relational database management systems. An SQL query is the respective user query formatted in SQL. The SQL query is issued to the DBMS 34, which executes the SQL query and returns a responsive data result set to the user.

Although SQL is a presently preferred language, other languages may alternatively be used for executable queries. In other alternative embodiments, a user query may be submitted to a respective database applications layer 36 in an appropriate language format for execution by the DBMS 34.

In alternative embodiments, an equivalent of the database applications layer 36 may reside on a server system (e.g., a SUN® SPARCstation™) with one or more user stations 24 (i.e., "thin clients") either locally, or remotely, connected to the server system. In this alternative configuration, the thin clients support an appropriate user interface, which is generally one or more programs that assist a user to access the database 32. In other alternative embodiments, the user stations 24 are "dumb" terminals. In this alternative configuration, an equivalent of the database applications layer 36 may reside on the host computer 22, along with the DBMS 34, or, alternatively, can reside on a separate, second computer (not shown) which interfaces with the host computer 22.

Figure 1B:
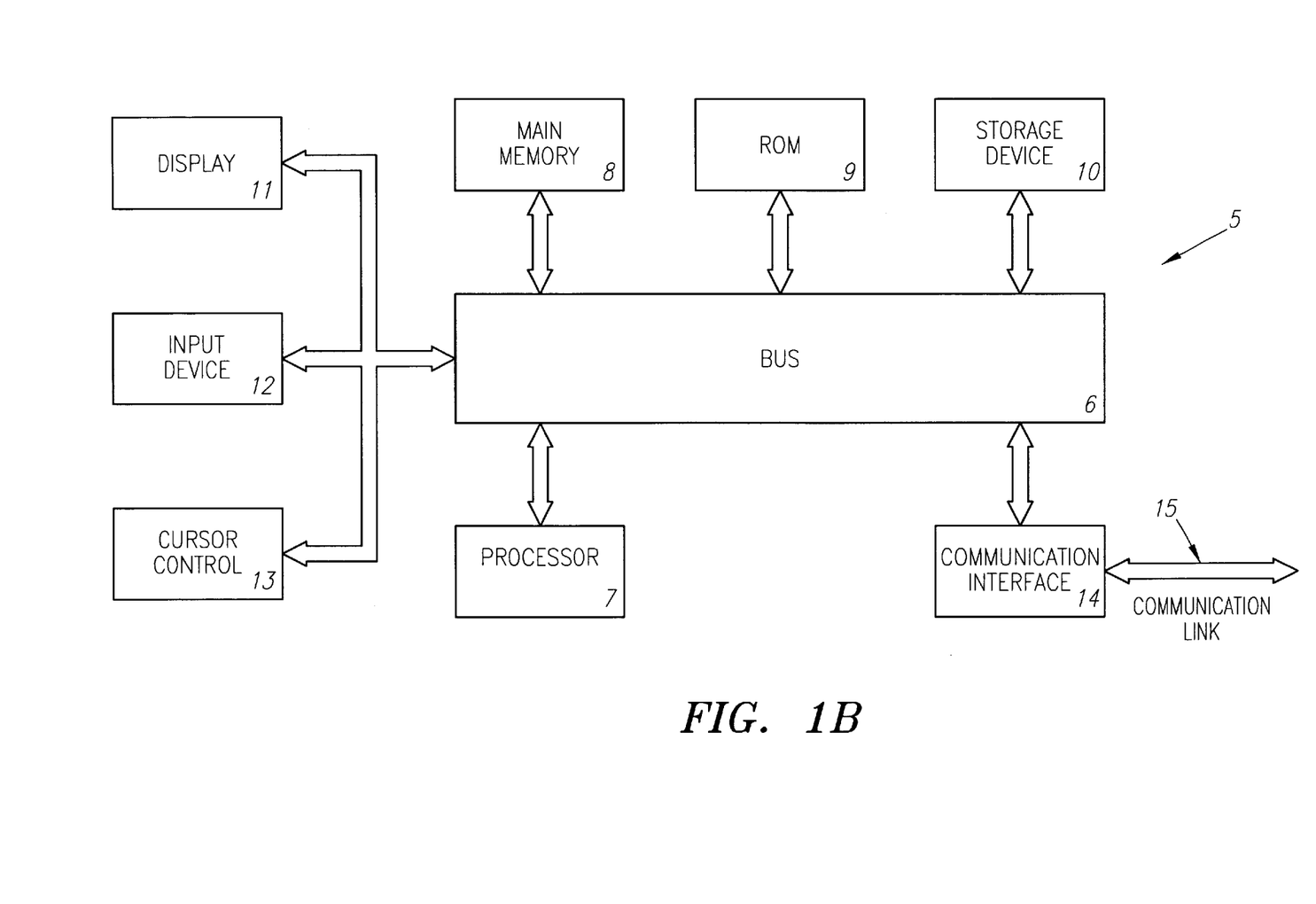
FIG. 1B is a simplified block diagram of an exemplary user station and an exemplary host computer of FIG. 1A.

Referring to FIG. 1B, in a presently preferred embodiment, each user station 24 and the host computer 22 (each referred to generally as a processing unit) embodies a general architecture 5. A processing unit includes a bus 6 or other communication mechanism for communicating instructions, messages and data (collectively, information), and one or more processors 7 coupled with the bus 6 for processing information. A processing unit also includes a main memory 8, such as a random access memory (RAM) or other dynamic storage device, coupled to the bus 6 for storing dynamic data and instructions to be executed by the processor(s) 7. The main memory 8 also may be used for storing temporary data (i.e., variables) or other intermediate information during execution of instructions by the processor(s) 7 .

A processing unit may further include a read only memory (ROM) 9 or other static storage device coupled to the bus 6 for storing static data and instructions for the processor(s) 7. A storage device 10, such as a magnetic disk or optical disk, may also be provided and coupled to the bus 6 for storing data and instructions for the processor(s) 7.

A processing unit may be coupled via the bus 6 to a display 11, such as a cathode ray tube (CRT), for displaying information to a user. An input device 12, including alphanumeric and other keys, is coupled to the bus 6 for communicating information and command selections to the processor(s) 7. Another type of user input device may include a cursor control 13, such as a mouse, a trackball, a fingerpad, or cursor direction keys for communicating direction information and command selections to the processor(s) 7 and for controlling cursor movement on the display According to one embodiment of the invention, the individual processing units perform specific operations by their respective processor(s) 7 executing one or more sequences of one or more instructions contained in the main memory 8. Such instructions may be read into the main memory 8 from another computer-readable medium, such as the ROM 9 or the storage device 10. Execution of the sequences of instructions contained in the main memory 8 causes the processor(s) 7 to perform the process steps described herein. In alternative embodiments, hard-wired circuitry may be used in place of or in combination with software instructions to implement the invention. Thus, embodiments of the invention are not limited to any specific combination of hardware circuitry and/or software.

The term "computer-readable medium", as used herein, refers to any medium that provides information to the processor(s) 7. Such a medium may take many forms, including, but not limited to, non-volatile, volatile and transmission media. Non-volatile media, i.e., media that can retain information in the absence of power, includes the ROM 9. Volatile media, i.e., media that can not retain information in the absence of power, includes the main memory 8. Transmission media includes coaxial cables, copper wire and fiber optics, including the wires that comprise the bus 6. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-readable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 7 can retrieve information.

Various forms of computer-readable media may be involved in providing one or more sequences of one or more instructions to the processor(s) 7 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 6 may receive the infrared signals and place the instructions therein on the bus 6. The bus 6 may carry the instructions to the main memory 8, from which the processor(s) 7 thereafter retrieves and executes the instructions. The instructions received by the main memory 8 may optionally be stored on the storage device 10, either before or after their execution by the processor(s) 7.

Each processing unit may also include a communication interface 14 coupled to the bus 6. The communication interface 14 provides two-way communication between the respective user stations 24 and the host computer 22. The communication interface 14 of a respective processing unit transmits and receives electrical, electromagnetic or optical signals that include data streams representing various types of information, including instructions, messages and data.

A communication link 15 links a respective user station 24 and a host computer 22. The communication link 15 may be a LAN 26, in which case the communication interface 14 may be a LAN card. Alternatively, the communication link 15 may be a PSTN 28, in which case the communication interface 14 may be an integrated services digital network (ISDN) card or a modem. Also, as a further alternative, the communication link 15 may be a wireless network 30.

A processing unit may transmit and receive messages, data, and instructions, including program, i.e., application, code, through its respective communication link 15 and communication interface 14. Received program code may be executed by the respective processor(s) 7 as it is received, and/or stored in the storage device 10, or other associated non-volatile media, for later execution. In this manner, a processing unit may receive messages, data and/or program code in the form of a carrier wave.

The database applications layer 36 of a respective user station 24 allows a user to access the database 32 by forming and submitting queries on the user station 24. By way of example, referring to FIG. 2A, a user may wish to know the names of the employees in a particular company department. In this example, the employees names are stored in an "emp" table 41 in the database 32. In addition to employee names 42, the emp table 41 contains each employee's social security number 43, department number 44, and salary 45. To obtain the desired information, the user issues a query to access the emp table 41, which requests the employee names 42 assigned to a department number 44. The database application layer 36 of the user station 24 generates an SQL version of the user-submitted query and the SQL query is issued to the DBMS 34. The DBMS 34 thereafter executes the SQL query, accesses the desired data in the emp table 41, i.e., the employee names 42 corresponding to the specified department number 44, and responds with the employee names 42 in the records 50 of the emp table 41 that also include the requested department number 44.

Figure 2A:
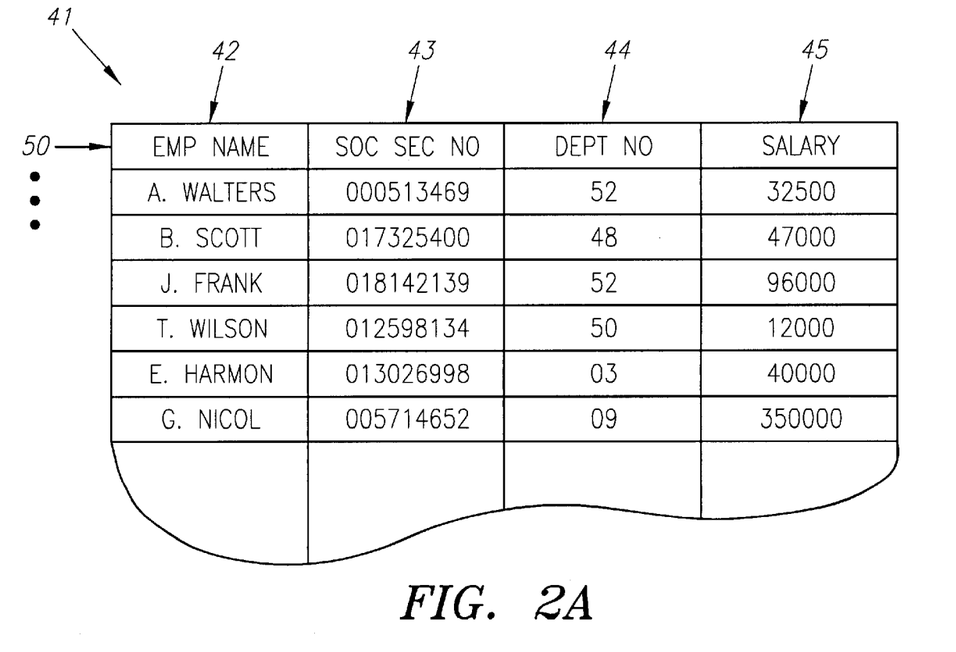
FIGS. 2A and 2B depict exemplary database tables.

A user may also issue a query for information derived from values of various data items in a table. For example, a user may wish to know the average salaries for the employees in each company department. Again, the user would issue a query for accessing the emp table 41, requesting the averages of salaries 45 for the employees 42 of each department number 44. As in the previous example, the database applications layer 36 of the respective user station 24 generates an SQL version of the user-submitted query and issues it to the DBMS 34. The DBMS 34 correspondingly generates and returns the average salary for each department number, based upon the contents, i.e., data items, of the records 50 in the emp table 41. In this example, unlike in the previous example, the DBMS 34 after first retrieving the pertinent data, had to calculate the respective averages, before returning a response to the user.

For tables with a large number of records, the responsive data generation process may require a great deal of system resources and time. If, however, the requested information had been available in a pre-computed summary table, then a response to the query would generally be much quicker and require fewer system resources. A summary table includes pre-generated resultant data set values from a user query, i.e., a summary table contains summarized data from one or more other tables. If, in the last example, a summary table was created that contains the average salary for each department number, the DBMS 34, upon being issued an SQL query for the average salary for a particular department, would only need access the summary table, a process that will generally be faster and consume fewer system resources than accessing the emp table 41 and making the necessary calculations.

A user may issue a query seeking information derived from data items stored in more than one table. For example, referring to FIGS. 2A and 2B, a "dept" table 51 also exists in the database 32, and contains the department names 52 and corresponding department numbers 44 for the respective company. If a user wants to know the name of each employee by the name of their department, the executable query, which is the SQL version of the user-submitted query, must access both the emp table 41 and the dept table 51.

Figure 2B:
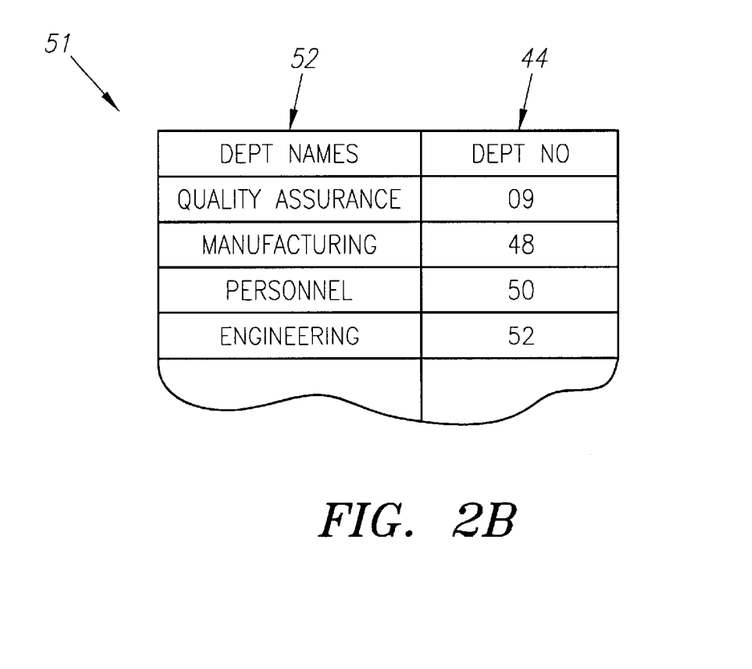

The dept table 51 is accessed to derive the department name 52 for each respective department number 44, and the emp table 41 is accessed to derive the employee names 42 for each department number 44. The department number data items in the dept column 44 for the respective emp table 41 and the respective dept table 51 are the join between the two tables in that the department number column 44 of each table is a common element between the two tables 41 and 51. This allows these tables to be used in conjunction by the DBMS 34 to retrieve a responsive data result set for the query in this example.

As with the previous example, for tables with many records, the process of generating a resultant data set for a query requiring access to more than one table, i.e., involving one or more joins, can be system resource and time intensive. To improve runtime performance, a resultant data set derived from accessing more than one table may be pre-generated and stored in a summary table.

A preferred methodology for accessing and using summary tables is provided in U.S. patent application Ser. No. 08/962,533, entitled "Summary Table Query Routing," filed on the same day as the present application and fully incorporated herein by reference for all that it discloses.

In accordance with a general aspect of the present invention, a process for creating and maintaining the most effective summary tables is provided.

Figure 3:
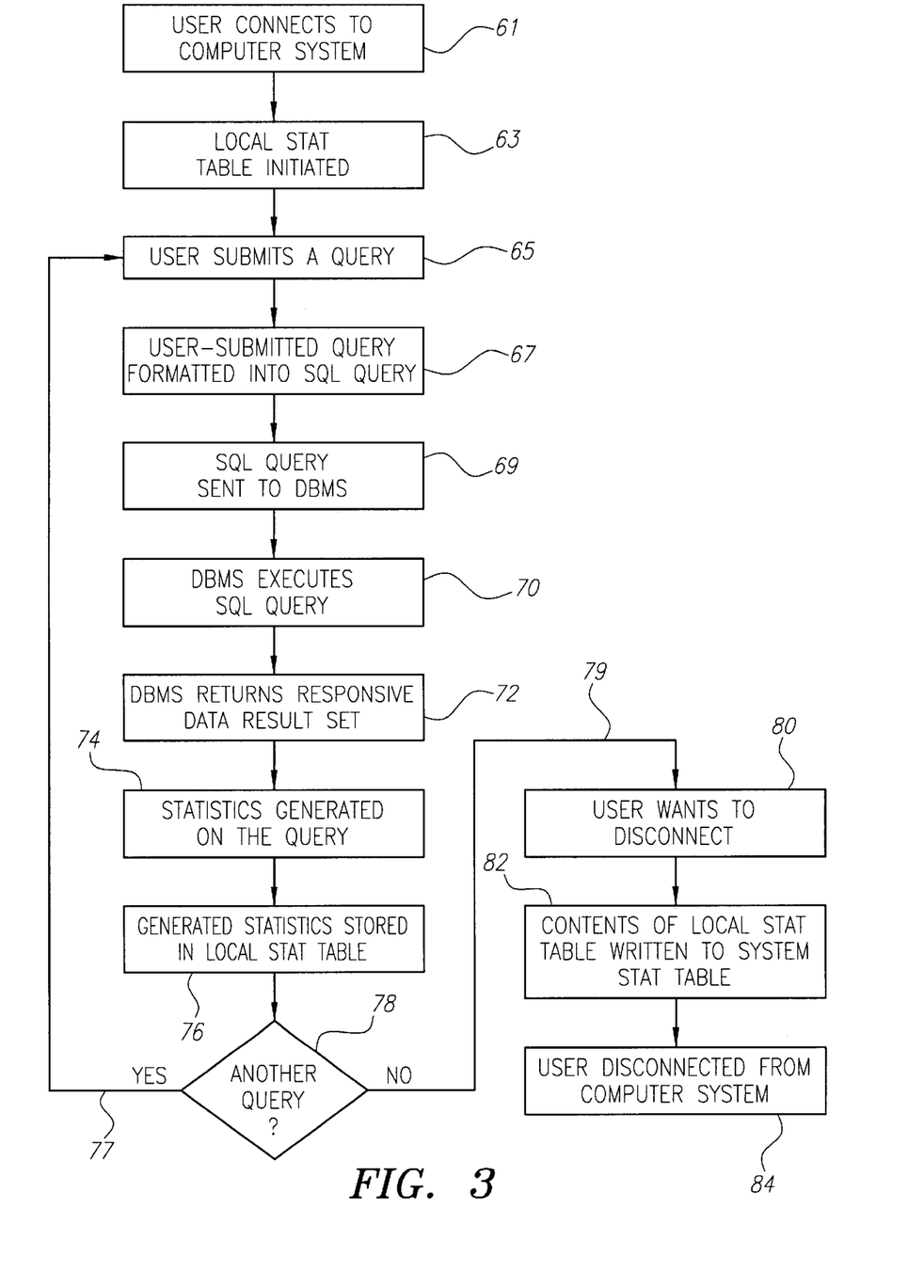
FIG. 3 is a flowchart depicting a preferred methodology for generating statistics from user-submitted queries.

Referring to FIG. 3 in conjunction with FIG. 1A, when a user connects 61, e.g., logs on, to the computer system 20, a local statistics (stat) table is initialized 63 in the respective user station database applications layer 36. When the user thereafter submits a query 65, the respective database applications layer 36 formats the query into an SQL query 67 and issues the SQL query to the DBMS 34 for execution 69. The DBMS 34 executes the query 70 and returns a responsive data result set 72 to the database applications layer 36. The database applications layer 36 generates certain statistics 74 about the query and response data, and stores the statistics 76 in a record of the local stat table.

The user then decides if he or she wishes to submit another query 78. If the user indicates that "yes" he or she wishes to submit another query 77 the above process is repeated. If the user indicates that "no" he or she does not wish to submit another query, the user may elect to disconnect, e.g., logoff, from the computer system 20. If the user chooses to disconnect 80, the respective user station applications layer 36 writes the contents of the local stat table to a system stat table 82. The system stat table is maintained by the DBMS 34 whereas the local stat table is maintained by the respective user application layer 36. The system stat table is a collection of records of statistics of user queries gathered from all of the user stations 24 that have submitted queries to the DBMS 34. The respective user applications layer 36 then disconnects 84 the user from the computer system 20.

If the user cancels a query before the DBMS 34 responds to it with a data result set, no query statistics record is generated or stored for the canceled query.

In an alternate embodiment, each time a responsive data result set is returned to the data applications layer 36 of a respective user station 24 in response to a query, the data applications layer 36 generates the appropriate query statistics record and then writes the query statistics record to the system stat table. In this embodiment, the data applications layer 36 does not need to have a local stat table; however, it writes the query statistics records to the system stat table more frequently. In other alternative embodiments the database applications layer 36 writes the query statistics records it has generated to the system stat table on a predetermined periodic basis, or after a predefined number of records have been generated.

Figure 4:
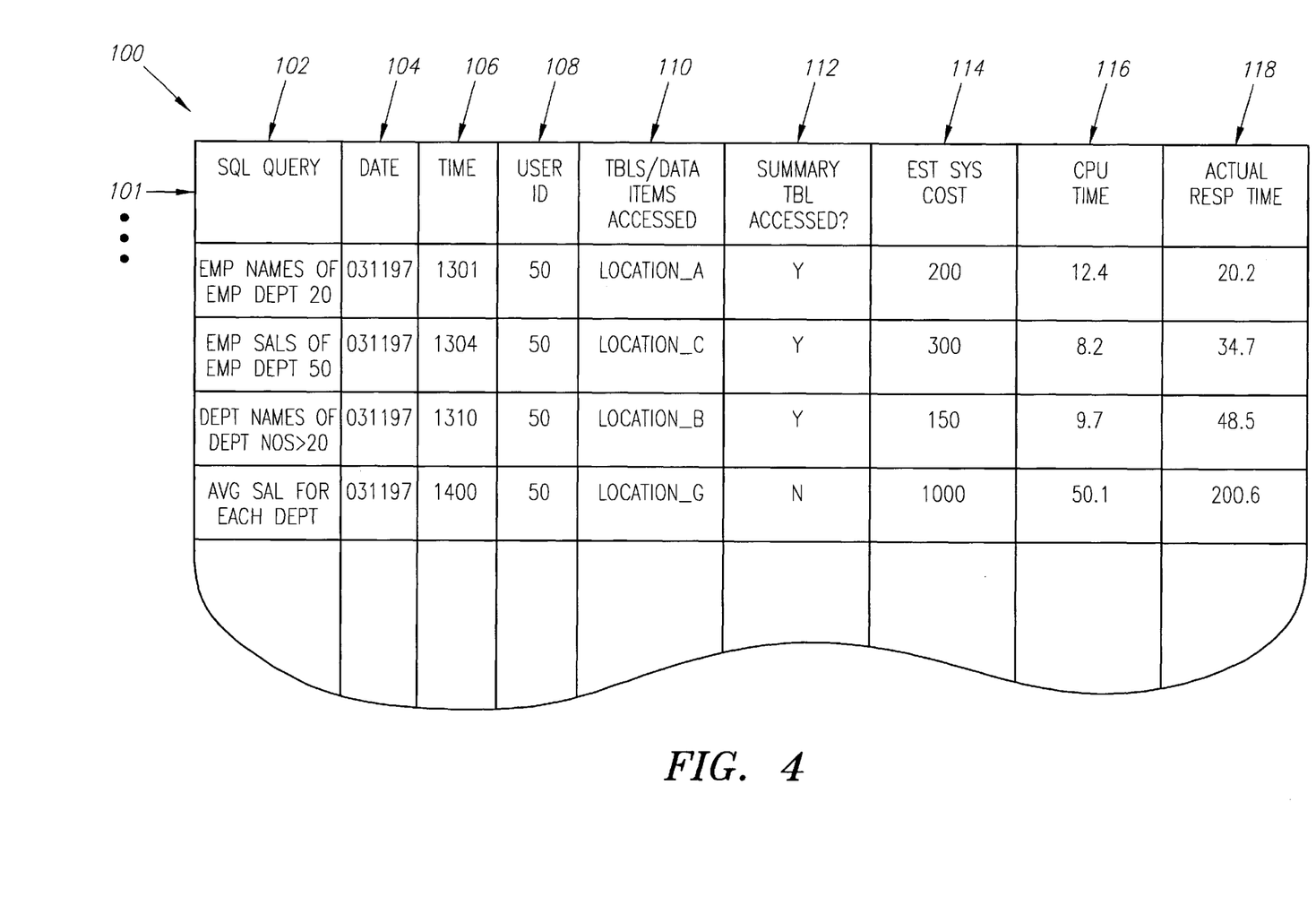
FIG. 4 is a simplified block diagram of exemplary query statistic records generated in accordance with the methodology of FIG. 3.

FIG. 4 depicts a presently preferred system stat table 100 including a set of query statistics records 101 created in step 74 of the method described with regard to FIG. 3 and stored in the system stat table in step 76. Each row 101 of the system stat table 100 constitutes a record and is created for each query that is executed by the DBMS 34. In a presently preferred embodiment the local stat tables on the respective user stations 24 have the same format, i.e., contain the same data attributes, as the system stat table 100.

Generally, the rows 101 of the system stat table 100 are never purged, as the information stored in the records 101 requires relatively nominal memory space. Additionally, the contents of the system stat table 100 may be used for historical data information purposes and, thus, may be beneficial to maintain.

In a presently preferred embodiment, however, rows 101 of the system stat table 100 may be purged by submitting a request to the DBMS 34. For example, a system administrator may submit a request to the database applications layer 36 of the respective user station 24 on which he/she is operating to delete rows 101 of the system stat table 100 that have been in the systems stat table 100 for more than one year. The database applications layer 36 thereafter requests the DBMS 34 to delete the system administrator specified rows. Alternatively, a database applications layer 36 may include a program to automatically request the DBMS 34 to delete rows 101 of the system stat table 100, based on pre-defined criteria. Alternatively, the DBMS 34 may include a program to automatically delete rows 101 of the system stat table 100, based on predefined criteria.

In particular, the query statistics generated and stored in the system stat table 100 preferably include: an internal system representation of the respective executable SQL queries 102; the date 104 and the time 106 the user query was submitted to the computer system 20; the user ID 108 of the respective user station 24 from which the user query was submitted; an identification 110 of the database tables and respective data items accessed by the executable SQL query; an indication 112 of whether or not a summary table was accessed when the SQL query was executed; an estimated system cost 114 of executing the SQL query; the actual CPU execution time 116 of the SQL query; and the actual total elapsed time 118 from when the user submitted his/her query to when the database applications layer 36 returned a responsive data result set to the user.

A preferred methodology for estimating the time required for the DBMS 34 to respond to a query is provided in U.S. patent application Ser. No. 08/962,538, entitled "Systems And Methods For Estimating Query Response Times In A Computer System," filed on the same day as the present application and fully incorporated herein by reference for all that it discloses.

Additionally, in a presently preferred embodiment, the statistics for a query may include the joins used, if multiple tables were combined, and/or the aggregate functions (e.g., summation ("SUM") and average ("AVG")) used, if any. Alternative embodiments of the present invention may include statistics that incorporate an identification of the user requesting the respective query, and an indication of the filters, if any, used in the query.

Figure 5:
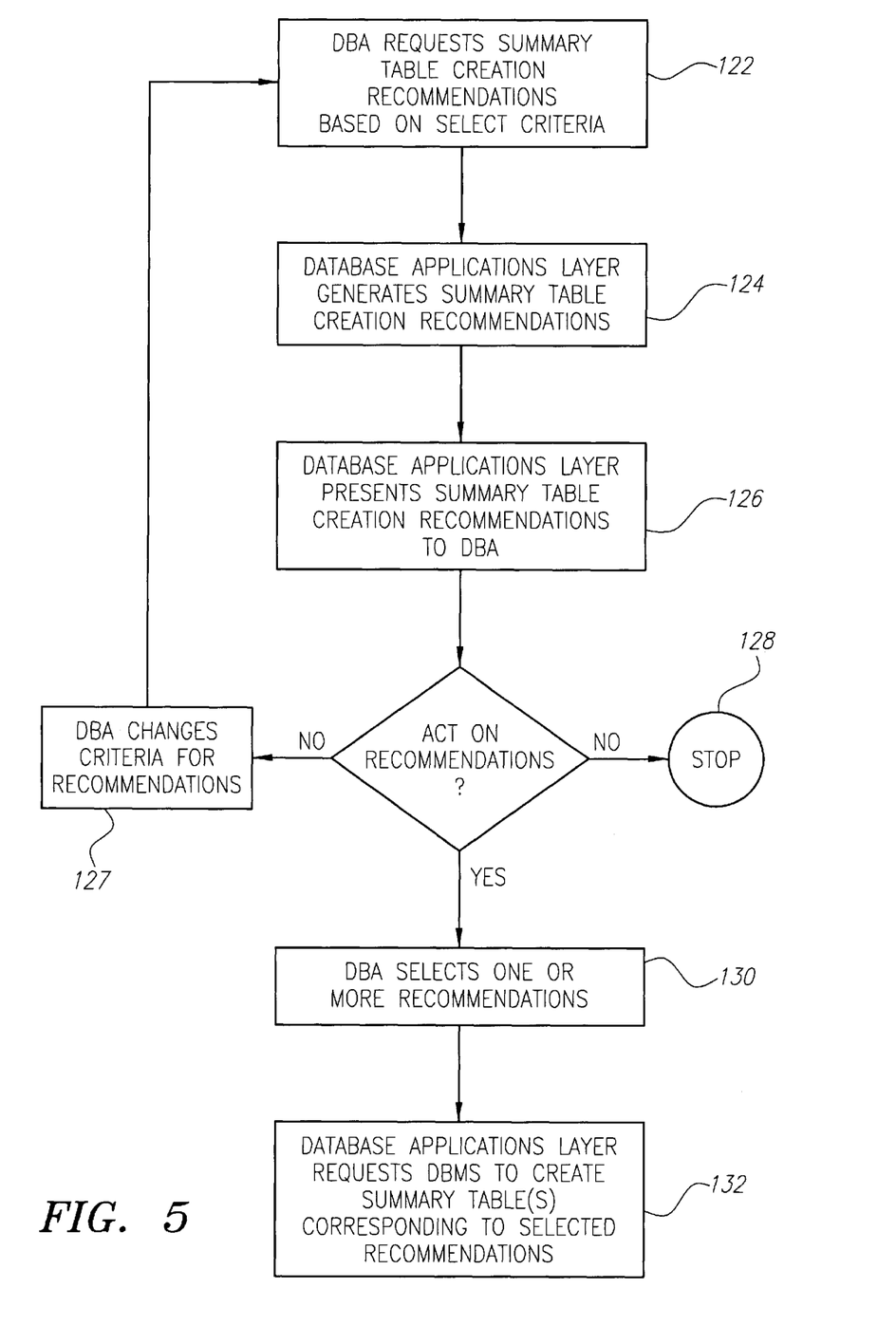
FIG. 5 is a flowchart depicting a preferred methodology for creating database summary tables.

Referring to FIG. 5, in a presently preferred embodiment of the present invention a database system administrator ("DBA") may, at any time, request 122 a set of summary table creation recommendations. Based on DBA-supplied criteria and the query records 101 currently residing in the system stat table 100, the respective database applications layer 36 of the user station 24 on which the DBA is operating generates 124 and presents 126 summary table creation recommendations to the DBA. The summary table creation recommendations are preferably returned to the DBA 126 in the form of respective queries the recommended summary tables would be responsive to.

In a presently preferred embodiment, the respective database applications layer 36 presents the summary table creation recommendations to the DBA via a wizard interface that the DBA also uses as part of the entire summary recommendation/management process. The summary table recommendations may also be presented to the DBA via a workbook interface. Other user interfaces may also be used for interaction with the DBA, which may require different, less or no DBA intervention in the summary table recommendation/management process.

Once the respective database applications layer 36 presents summary table creation recommendations 120 to the DBA, the DBA can choose to act on one or more of the recommendations 130, to do nothing 128, or to request new summary table creation recommendations based on different criteria 127. By way of example, the DBA may first request summary table creation recommendations for all user-submitted queries executed within the past month. Based on the (probably large) number of recommendations returned by the database applications layer 36, the DBA may request a new set of summary table creation recommendations based on only those user-submitted queries executed within the past week.

If the DBA chooses to implement one or more summary table creation recommendations 130, the database applications layer 36 requests the DBMS 34 to create 132 a respective summary table for each selected recommendation, as described in greater detail below.

The respective database applications layer 36 preferably generates summary table creation recommendations 130 by evaluating both the CPU time required to execute specific SQL queries, and the frequency of which respective SQL queries are repeated, as reflected in the query statistics stored in the system stat table (e.g., in the respective columns 102 and 116 of the system stat table 100 shown in FIG. 4). As previously described, each time a user query is submitted to the computer system 20 and is responded to, a record of respective query statistics is generated for it and stored in a system stat table 100. The number of records 101 in the system stat table 100 for a specific user query, i.e., the number of records 101 containing the same query 102 of FIG. 4, indicates the frequency with which the user query has been submitted to the computer system 20. A presently preferred expression for generating a summary table creation recommendation is:

$$\log(f)^2(\text{cpu}+1)$$

where, bounded by the DBA-supplied criteria for summary table creation recommendations, f is the frequency with which a user query was submitted to the computer system 20, and cpu is the average CPU execution time for its respective SQL queries, in actual CPU seconds.

This preferred algorithm places more emphasis on the frequency of user-submitted queries than on the respective CPU execution times. Also, this algorithm reduces the otherwise large differences that can be caused by CPU times that approach zero. Additionally, due to its logarithmic nature, the algorithm scales over what are often very large user-submitted query frequencies.

In a presently preferred embodiment, summary tables responsive to queries that are submitted relatively more frequently and which generally take longer to execute than others are placed in a first tier of recommendations; summary tables responsive to queries submitted relatively more frequently, but which generally take a shorter amount of time to execute, are in a second tier of recommendations; and summary tables responsive to queries submitted relatively less frequently, but which generally take longer to execute are placed in a third tier of recommendations.

Summary tables responsive to queries that are submitted relatively less frequently and which generally take shorter amounts of time to execute than others, fall into a fourth tier of recommendations. The fourth tier recommendations are preferably not recommended for creation, as these queries will generally not impact system performance and the system cost of building, storing and maintaining the table is generally not worth the little, if any, benefit.

In a preferred embodiment each of the SQL queries stored in a record 101 in the system stat table 100 that is within the selected DBA-defined bounds for summary table creation recommendations, are ranked into the first, second and third tiers according to its corresponding value derived by the above-disclosed algorithm. The respective queries are then presented to the DBA, with the highest ranked query being displayed first, (i.e., at the top of the summary table creation recommendation list supplied to the DBA), and the lowest ranked query being displayed last.

Figure 6:
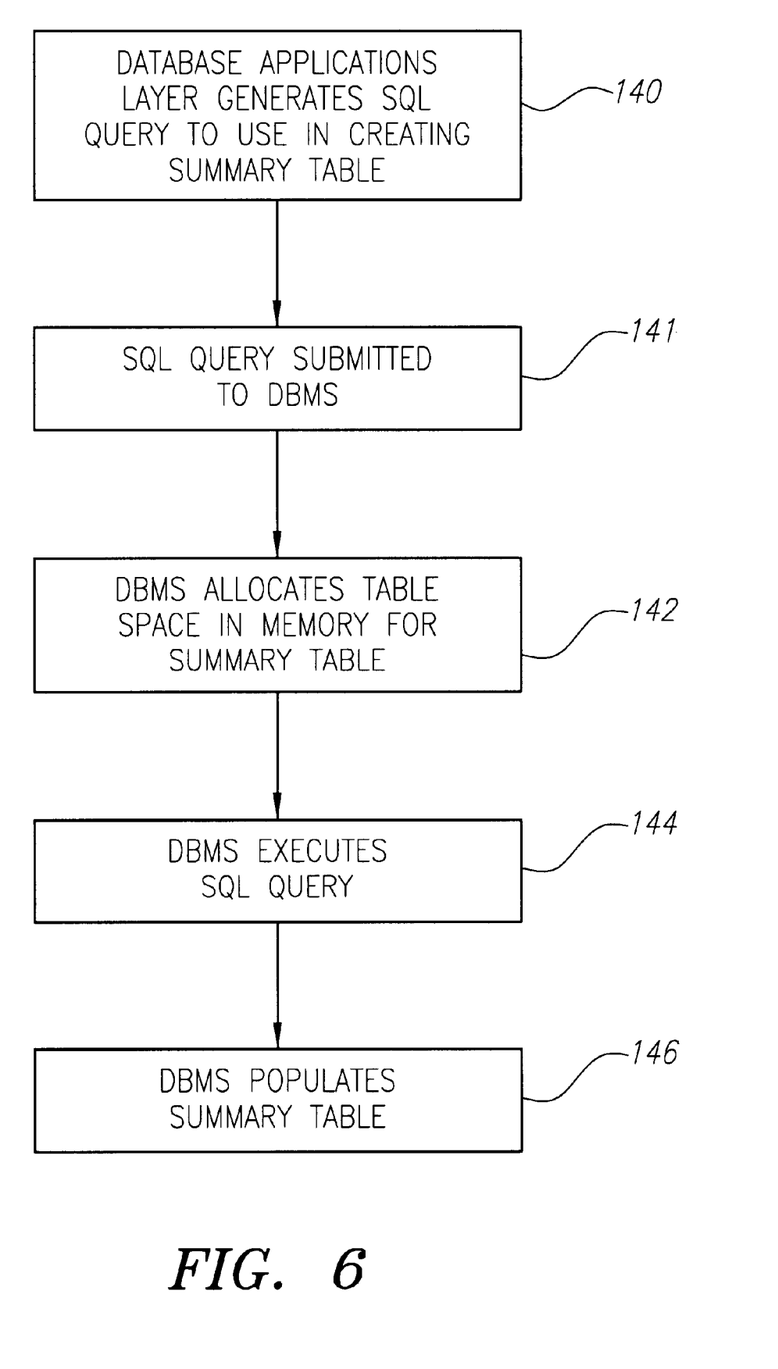
FIG. 6 is a flowchart depicting a more specific preferred methodology for creating database summary tables.

In accordance with a further aspect of the present inventions, once the DBA selects a particular summary table to be created, the respective database applications layer 36 automatically requests the DBMS 34 to create it. In particular, FIG. 6 depicts a method for creating summary tables. To create a new summary table, the respective database applications layer 36 generates an SQL query 140 from the query statistics of the record 101 used to generate the particular summary table creation recommendation. This query is then submitted 141 to the DBMS 34 for execution. The DBMS 34 allocates table space 142 in an associated memory cache to hold the data items that will be in the summary table, if there is enough memory space available.

The DBMS 34 executes the respective SQL query 144 and populates the new summary table 146 with the responsive data result set.

In a presently preferred embodiment, the respective database applications layer 36 generates PL/SQL packages that have SQL queries for various summary tables to be created. PL/SQL is a procedural language extension to SQL, produced as part of an Oracle® database product distributed by the Oracle Corporation, Redwood City, Calif., USA. In particular, PL/SQL packages are collections of related routines or functions in the form of SQL and PL/SQL statements.

In a presently preferred embodiment, the PL/SQL packages including the SQL queries to be used to populate new summary tables are executed as a batch job. In this manner, the DBA can schedule summary table creation at the database system's off-peak times, reducing the impact summary table creation has on overall system performance.

Figure 7:
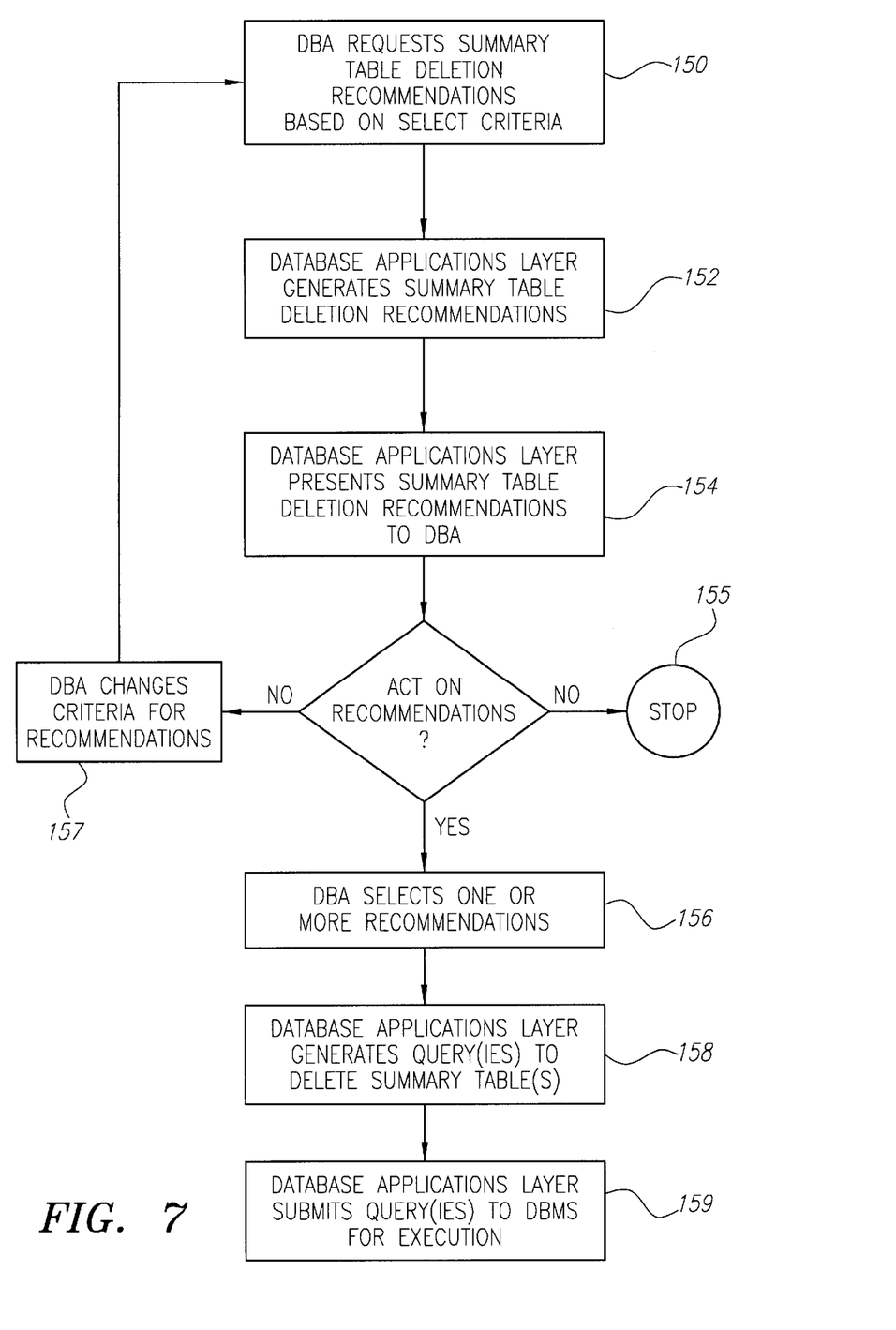
FIG. 7 is a flowchart depicting a preferred methodology for deleting database summary tables.

Referring to FIG. 7, in a presently preferred embodiment, the DBA may request summary table deletion recommendations 150. Based on DBA-supplied criteria, the respective database applications layer 36 generates a list of summary table deletion recommendations 152 and presents them 154 to the DBA. As with the summary table creation recommendations, summary table deletion recommendations are presented to the DBA in the form of the respective SQL queries the recommended summary tables are responsive to.

As also with creation recommendations, in a presently preferred embodiment, the respective database applications layer 36 presents the summary table deletion recommendations to the DBA via a wizard interface that the DBA also uses as part of the entire summary recommendation/management process. The summary table deletion recommendations may also be presented to the DBA via a workbook interface. Other user interfaces may also be used for interaction with the DBA, which may require different, less or no DBA intervention in the summary table recommendation/management process.

Once the respective database applications layer 36 presents the summary table deletion recommendations 154 to the DBA, the DBA can choose to act on one or more of the recommendations 156, to do nothing 155, or to request new summary table deletion recommendations based on different criteria 157. If the DBA selects 156 one or more of the deletion recommendations, the database applications layer 36 generates a respective query or queries 158, that, when executed, deletes the selected summary table(s) from the database 32. The database applications layer 36 submits the respective query(ies) 159 to the DBMS 34 for execution.

In a presently preferred embodiment, the respective database applications layer 36 generates the summary table deletion recommendations based on the number of times a summary table was accessed by user queries submitted within a time period specified by the DBA. For example, if the DBA requested summary table deletion recommendations based on queries run over the last week, the number of times each summary table was accessed during the last week by respective SQL queries is used to rank the summary tables. Those queries that were executed most infrequently are ranked highest, indicating that the respective summary tables they access are not generally in use.

In a presently preferred embodiment, the respective database applications layer 36 includes a program to automatically generate summary table creation and deletion recommendations. For example, the respective database applications layer 36 may include a program to generate creation and/or deletion recommendations at specified time intervals, e.g., every Monday at 7:00 a.m., based on preset criteria, e.g., based on the query statistics for the previous week.

Further, the respective database applications layer 36 may include a program to automatically create summary tables for a predetermined number "x" (e.g., 5) of the highest ranked creation recommendations and/or to automatically delete a predetermined number "y" (e.g., 3) of the highest ranked deletion recommendations. In this manner, summary table management may be automated for a respective database, requiring no regular or ongoing DBA intervention.

In alternative embodiments, either frequency or execution time alone may be used as the criteria for summary table creation or deletion recommendations by the respective database applications layer 36—i.e., those queries that are repeated most frequently or require the longest execution times during the DBA-selected time period would merit creation recommendations, and those summary tables that are accessed the least during the selected time period would merit deletion recommendations.

In alternative embodiments, whenever a summary table is created, it is registered with the user stations 24 of the respective computer system 20. In this manner, the database applications layer 36 of the respective user stations 24 know that there is a summary table that can be accessed for a particular user query; i.e., a respective database applications layer 36 will generate an SQL query for a respective user query, when appropriate, that accesses the summary table. Likewise, in this embodiment, when a summary table is deleted, it is de-registered with the user stations 24 of the respective computer system 20. In this manner, the database applications layer 36 of the respective user stations 24 will no longer generate SQL queries that access the deleted summary table.

While preferred embodiments are disclosed herein, many variations are possible which remain within the spirit and scope of the invention. The invention therefore is not to be restricted except by the scope and spirit of the appended claims.

What is claimed is:

1. A method for managing a database, comprising:
   generating a plurality of statistics for each of a plurality of queries submitted to a database system;
   storing one or more generated statistics for each of the plurality of queries;
   generating a summary table creation recommendation based on one or more of the generated statistics for a query submitted to the database system; and
   creating a summary table based on the summary table creation recommendation.

2. The method of claim 1, in which generating a plurality of statistics for each of a plurality of queries comprises determining the CPU execution time for each of the plurality of queries.

3. The method of claim 2, in which generating a plurality of statistics for each of a plurality of queries further comprises measuring the frequency with which a query of the plurality of queries is executed by the database system.

4. The method of claim 3, in which generating a summary table creation recommendation comprises generating the summary table creation recommendation from the frequency with which a query of the plurality of queries is executed by the database system and from an average of the CPU execution times for the query.

5. The method of claim 1, further comprising:
   generating a plurality of summary table creation recommendations, each based on one or more of the generated statistics for a query submitted to the database system;

ranking the plurality of summary table creation recommendations;

providing one or more of the plurality of summary table creation recommendations to a database administrator; and creating a summary table based on the database administrator choosing a summary table creation recommendation.

6. The method of claim 5, in which ranking the plurality of summary table creation recommendations comprises ranking each of the plurality of summary table creation recommendations into one of four groups, the first group comprising the summary table creation recommendations that are responsive to those queries of the plurality of queries submitted to the database system that were executed by the database system relatively more frequently and that took a relatively longer amount of CPU time to execute, the second group comprising the summary table creation recommendations that are responsive to those queries of the plurality of queries submitted to the database system that were executed by the database system relatively more frequently and that took a relatively shorter amount of CPU time to execute, the third group comprising the summary table creation recommendations that are responsive to those queries of the plurality of queries submitted to the database system that were executed by the database system relatively less frequently and that took a relatively longer amount of CPU time to execute, and the fourth group comprising the summary table creation recommendations that are responsive to those queries of the plurality of queries submitted to the database system that were executed by the database system relatively less frequently and that took a relatively shorter amount of CPU time to execute.

7. The method of claim 5, in which providing one or more of the plurality of summary table creation recommendations to a database administrator comprises supplying to the database administrator a query that a summary table would be responsive to for each of the one or more plurality of summary table creation recommendations.

8. The method of claim 1, in which storing one or more generated statistics for each of the plurality of queries comprises storing one or more generated statistics for each query submitted by a user to the database system in a record in a user table on the user's processing device and thereafter storing each record in the user table in a system table maintained by the database system.

9. The method of claim 8, in which a representation of an executable SQL query for a query submitted to the database system is stored in one or more respective records of the system table, and a generated statistic for the query submitted to the database system is the number of records in the system table that comprise the representation of the executable SQL query.

10. A method for managing summary tables in a database, comprising:

determining the frequency that a user query was processed by a database system;

generating a summary table creation recommendation based on the frequency that the user query was processed by the database system; and generating a summary table deletion recommendation based on the frequency that a summary table is accessed by user queries processed by the database system.

11. The method of claim 10, further comprising:

presenting the summary table creation recommendation to a database administrator;

creating a summary table based on the summary table creation recommendation if the summary table creation is requested by the database administrator;

presenting the summary table deletion recommendation to the database administrator; and deleting a summary table based on the summary table deletion recommendation if the summary table deletion is requested by the database administrator.

12. The method of claim 10, further comprising: determining the frequency that each of a plurality of user queries was processed by a database system;

generating a plurality of summary table creation recommendations, each summary table creation recommendation based on the frequency that a user query of the plurality of user queries was processed by the database system;

ranking the plurality of summary table creation recommendations based on the frequencies that the respective user queries were processed by the database system;

generating a plurality of summary table deletion recommendations each based on the frequency that a summary table is accessed by user queries processed by the database system; and ranking the plurality of summary table deletion recommendations based on the frequency that the respective summary table is accessed by user queries processed by the database system.

13. The method of claim 10, in which generating a summary table creation recommendation is further based on an average CPU execution time for responding to the user query.

14. The method of claim 10, in which generating a summary table creation recommendation is based on the frequency that the user query was processed by the database system within a specified timeframe, and in which generating a summary table deletion recommendation is based on the frequency that a summary table is accessed by user queries processed by the database system within the specified timeframe.

15. The method of claim 10, further comprising:

automatically creating a summary table based on the generated summary table creation recommendation; and automatically deleting a summary table based on the summary table deletion recommendation.

16. A machine readable medium having stored thereon a program for causing a computer to:

gather a plurality of query statistics for each of a plurality of queries processed by a database system;

rank a plurality of queries processed by the database system based on one or more gathered query statistics for each of the plurality of queries ranked;

generate a summary table creation recommendation based on a ranked query; and create a summary table based on the generated summary table creation recommendation.

17. The machine readable medium of claim 16, in which a query statistic of the plurality of query statistics for a query processed by a database system comprises the number of times the query is processed by the database system within a timeframe.

18. The machine readable medium of claim 17, in which a query statistic of the plurality of query statistics for a query processed by a database system comprises the CPU execution time for processing the query.

19. The machine readable medium of claim 18, in which the rank of a query processed by the database system is based on the number of times the query is processed by the database system within the timeframe and the average CPU execution time for processing the query within the timeframe.

20. The machine readable medium of claim 16, in which the program further causes the computer to generate a plurality of summary table deletion recommendations each based on the frequency that a summary table is accessed by queries processed by a database system within a timeframe, and rank the plurality of summary table deletion recommendations.

* * * * *